United States Patent

Hedges

[15] 3,680,079

[45] July 25, 1972

[54] APPARATUS FOR PROVIDING CONVERSION BETWEEN ANALOG AND DIGITAL VALUES

[72] Inventor: Charles P. Hedges, 3532 B Midwest Drive, Bryan, Tex. 77801

[22] Filed: June 8, 1970

[21] Appl. No.: 44,001

[52] U.S. Cl. ....................340/347 P, 235/201

[51] Int. Cl. ....................G08c 9/00

[58] Field of Search ....................340/347 P; 235/201

[56] References Cited

UNITED STATES PATENTS

| | | | |
|---|---|---|---|
| 3,110,893 | 11/1963 | Peacock | 340/347 |
| 3,204,235 | 8/1965 | De Rosa | 340/347 |
| 3,540,040 | 11/1970 | Sheane | 340/347 |
| 3,505,674 | 4/1970 | Hough | 340/347 |
| 3,473,571 | 10/1969 | Dugay | 235/201 |

*Primary Examiner*—Maynard R. Wilbur
*Assistant Examiner*—Jeremiah Glassman
*Attorney*—Smyth, Roston & Pavitt

[57] ABSTRACT

This invention relates to an encoder or converter which provides a conversion between analog and digital values of a functional relationship between two independent variables. For example, the invention provides a conversion between analog and digital values of a function R sin $\theta$. The conversion is provided in accordance with the synchronous movement along two coordinate axes of a plurality of encoded patterns relative to sensors associated with the patterns.

16 Claims, 10 Drawing Figures

INVENTOR:
Charles P. Hedges
By Smyth, Roston & Pavitt
ATTORNEYS

INVENTOR.
Charles P. Hedges
By Smyth, Roston & Pavitt
ATTORNEYS

INVENTOR.
Charles P. Hedges
By Smyth, Roston & Pavitt
ATTORNEYS

INVENTOR.
Charles P. Hedges
By Smyth, Roston & Pavitt
ATTORNEYS

INVENTOR.
Charles P. Hedges
By Smyth, Roston & Pavitt
ATTORNEYS

INVENTOR.
Charles P. Hedges
By Smyth, Roston & Pavitt
ATTORNEYS

INVENTOR.
Charles P. Hedges
By Smyth, Roston & Pavitt
ATTORNEYS

APPARATUS FOR PROVIDING CONVERSION BETWEEN ANALOG AND DIGITAL VALUES

This invention relates to a converter between analog and digital values for providing an indication as to the value of a function of two non-related variables. The invention may be used for providing a conversion from digital-to-analog values or from analog-to-digital values.

Considerable effort has been devoted in the past to perfect systems for providing a conversion of a single variable between analog and digital values. This extensive work has occurred over a period of time as long as the past 20 years. For example, rotary discs are provided with a plurality of tracks. Each of the tracks is coded to indicate at different positions the value of an individual binary digit. The tracks are movable synchronously relative to a plurality of elements or sensors each of which is associated with a different track in the plurality.

The coding on the tracks of the prior art may occur in various ways. For example, each track may have conductive and nonconductive portions and the sensor may constitute a conductive element which engages the track to sense the conductive portions. Each track may also have permanently magnetic and nonmagnetic portions coded in a particular relationship in accordance with the digit to be identified and the sensor may constitute a magnetic element which is responsive to the permanent magnets in the track. The relationship between the tracks and the sensors may also be optical.

Until now the converters have operated to convert a single analog value into digital signals or to convert digital signals into a corresponding analog value. No one has apparently appreciated that the analog value of a function of two non-related variables can be converted by a single converter into digital signals representing the analog value or that the digital signals can be converted by the converter into the corresponding analog value.

This invention provides a converter for providing a conversion between analog and digital values of a function of two non-related variables. For example, in one embodiment of the invention the converter indicates the value of a function R sin $\theta$. The invention provides a plurality of patterns each of which is constructed to indicate a different binary digit of the value of the function R sin $\theta$. Each pattern is constructed with first and second portions having configurations along first and second coordinate axes to provide an indication of the binary digit for different displacements along the first and second coordinate axes. The movements of the different patterns along the two coordinate axes are coordinated or synchronized so that each pattern has the same first displacement along a first axis and each pattern has the first coordinate axis and the same second displacement along the second coordinate axis. Each of the patterns is associated with an element or sensor which senses whether first or second portions in the pattern are adjacent to the associated element or sensor. When the sensor senses the first portion of the associated pattern, it produces a binary "1." However, when the sensor senses the second portions of the associated pattern, it produces a binary "0."

The apparatus described above has certain important advantages. One advantage is that it is able to provide, through a single movement along two coordinate axes, an indication of the value of the functional relationship between two independent variables. Another advantage is that the apparatus is able to be made as easily to provide an indication of two non-related variables as previous converters have been made to provide an indication of a single variable. A further advantage is that all of the technology previously developed in connection with converters operating upon a single variable are able to be utilized in this invention to provide a conversion between analog and digital values of the functional relationship of two independent variables.

Figure 10:
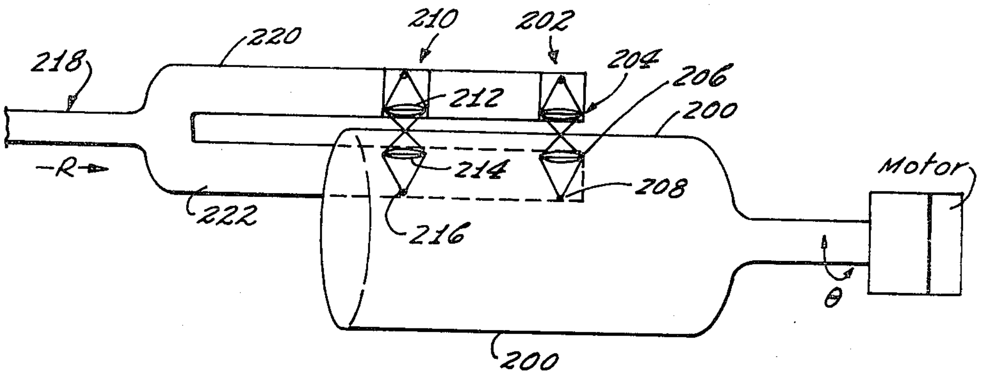
Figure 6:
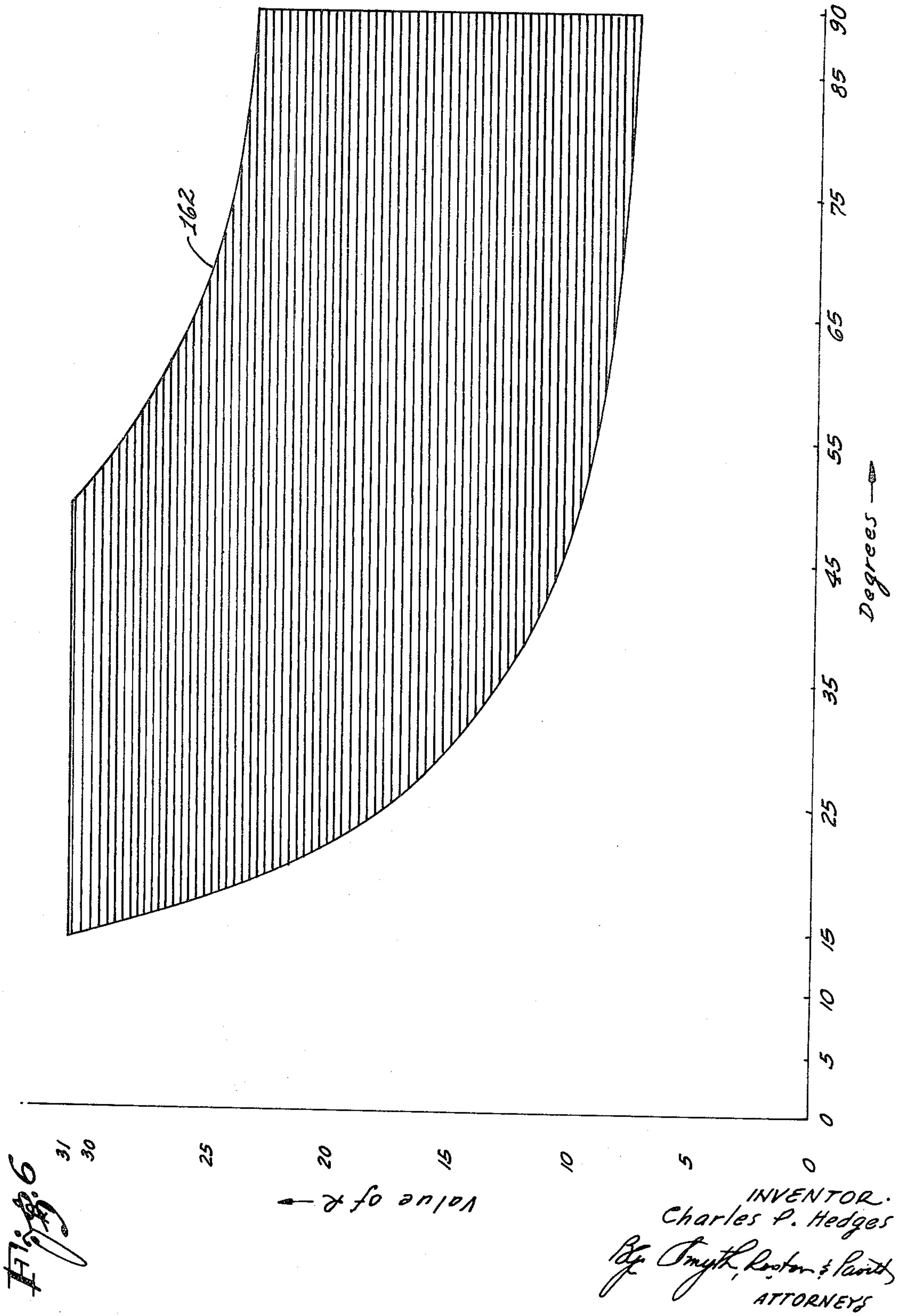
Figure 7:
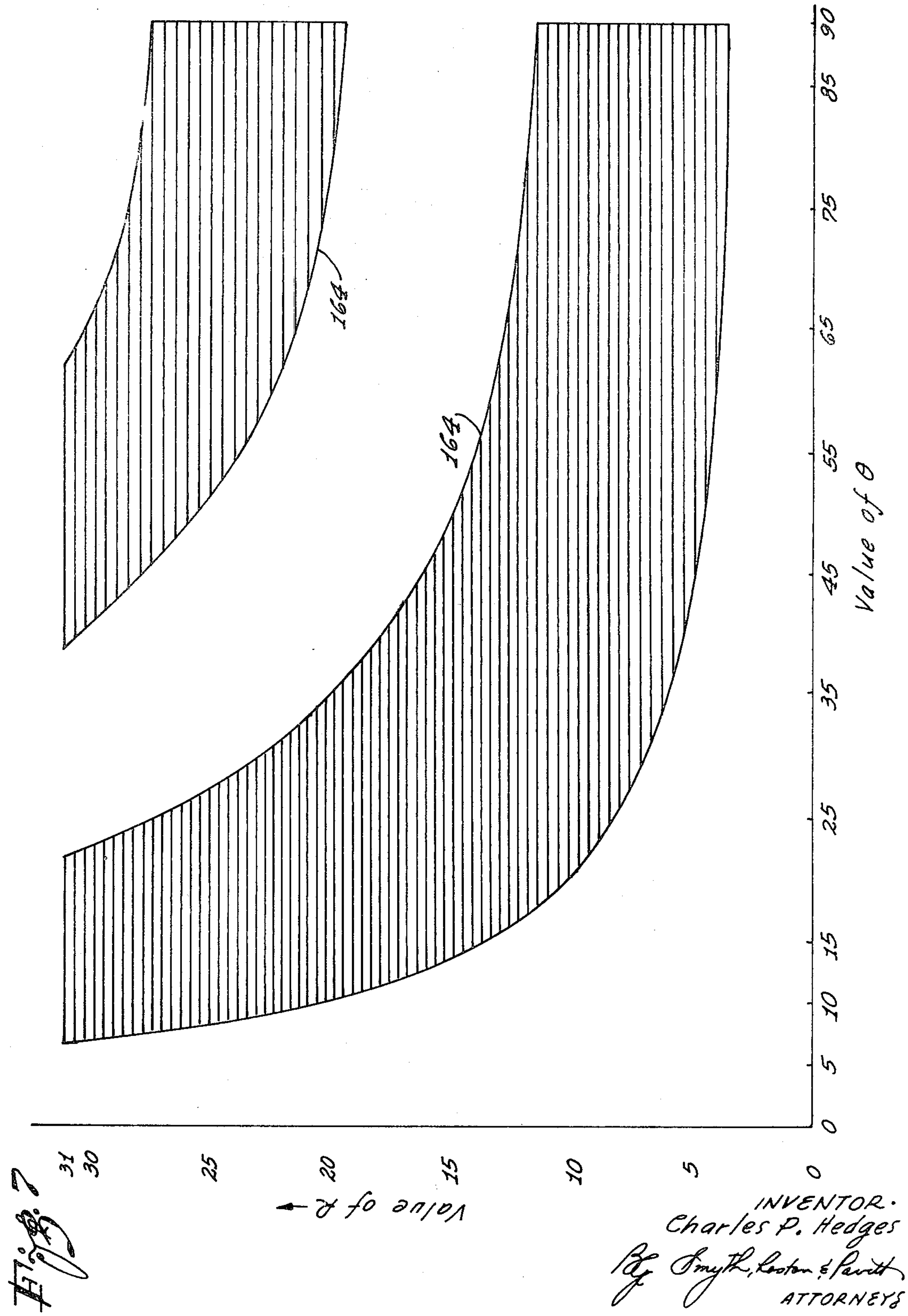
Figure 8:
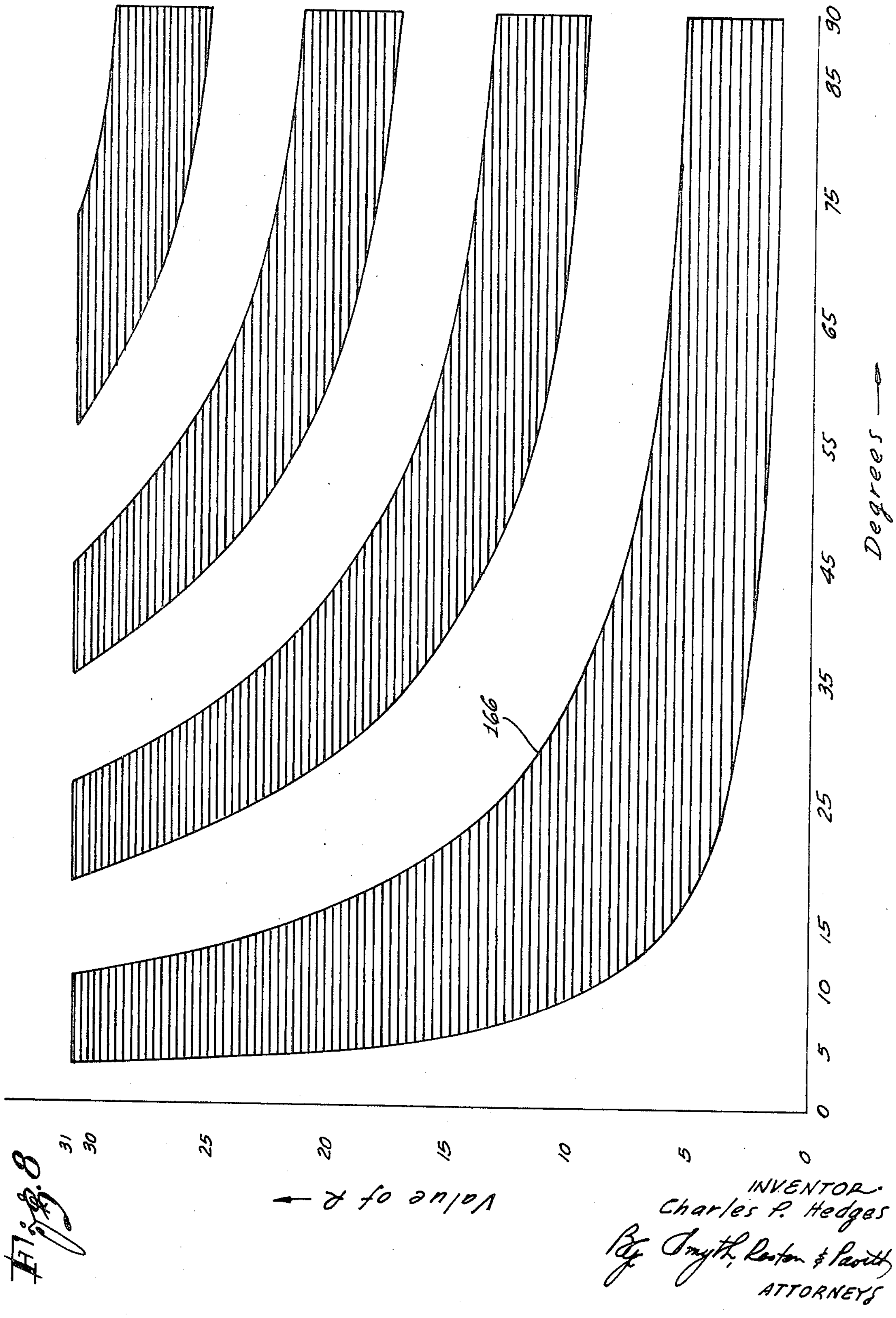
Figure 9:
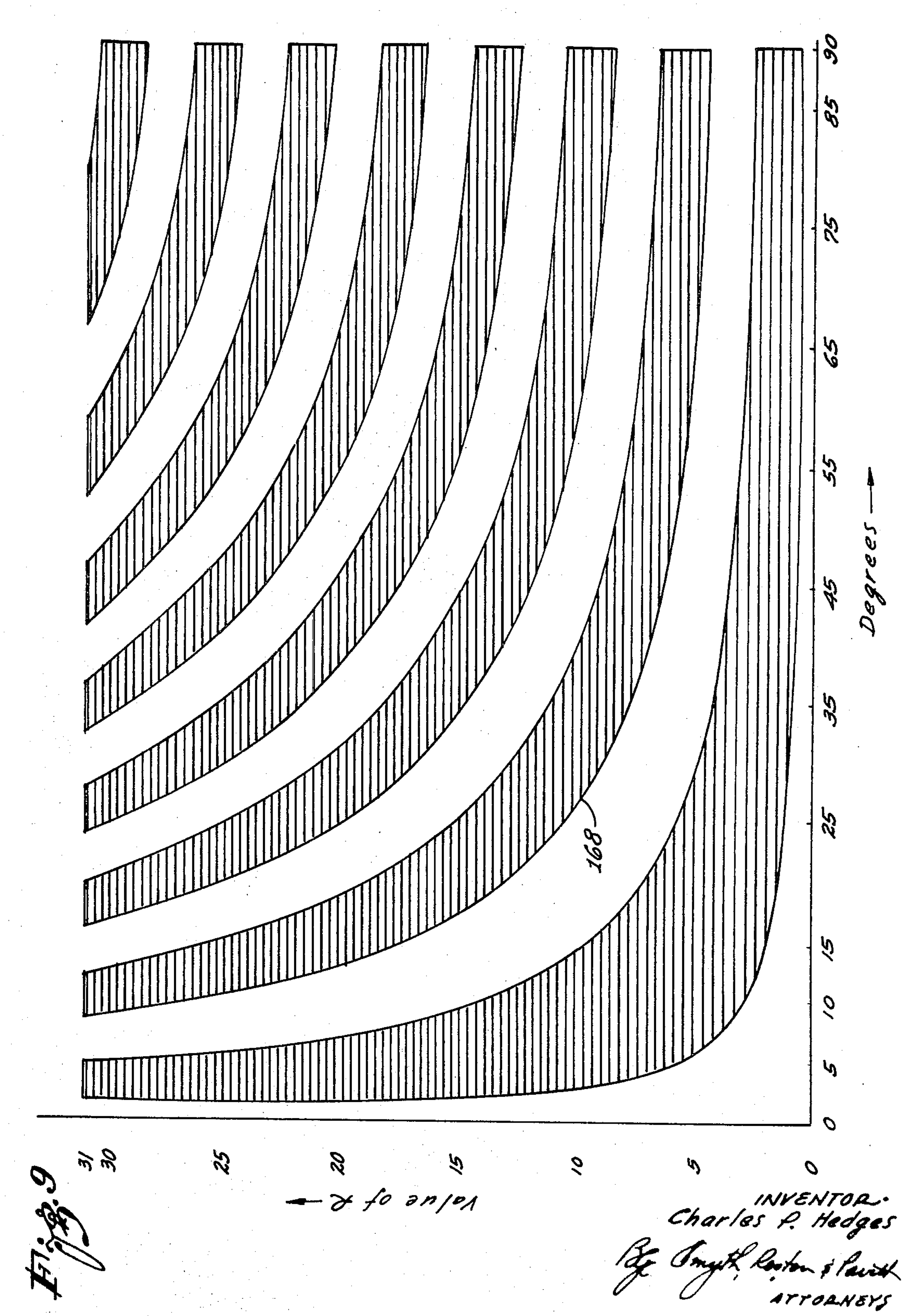

FIG. 6 provides an indication as to the configuration of first and second portions in a track of second greatest digital significance;

FIG. 7 provides an indication as to the configuration of first and second portions in a track of third greatest significant digit;

FIG. 8 provides an indication as to the configuration of first and second portions in a track of fourth greatest significant digit;

FIG. 9 provides an indication as to the configuration of first and second portions in a track of least digital significance; and FIG. 10 is a schematic indication of a second embodiment of the invention where one of the coordinate axes of the tracks is linear and the other coordinate axis of the tracks is cylindrical.

Figure 1:
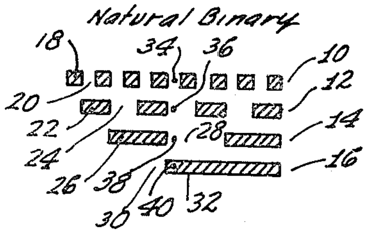
FIG. 1 PRIOR ART
FIG. 1 is a schematic diagram of a conventional converter known in the prior art for providing a conversion between analog and digital indications of a single variable when a natural binary code is used.

FIG. 1 illustrates a prior embodiment for providing a conversion between digital and analog values of a single variable. The embodiment includes a plurality of tracks 10, 12, 14, and 16. Each track is coded in a natural binary code to provide an indication of the value of a binary digit of individual significance. The tracks 10, 12, 14, and 16 are simultaneously movable toward the right or toward the left in FIG. 1 on a synchronous basis in accordance with the value to be indicated by the converter. The track 10 is provided with first portions 18 and second portions 20 to provide an indication of least digital significance. The portions 18 may be conductive or magnetic or may be provided with optical properties and the portions 20 may be nonconductive, nonmagnetic or may be provided with non-optical properties. The track 10 provides an indication of a decimal value of "1."

Similarly, the track 12 is provided with first portions 22 and second portions 24. The portions 22 and 24 may respectively have properties corresponding to the portions 18 and 20. The portions 22 and 24 have lengths twice as great as the portions 18 and 20 so as to provide an indication of a binary value of second least digital significance (corresponding to a decimal value of "2"). The track 14 may similarly be provided with portions 26 and 28 respectively corresponding to the portions 18 and 20. The portions 26 and 28 are approximately twice as long as the portions 22 and 24, and provide an indication of a binary value of third least digital significance (corresponding to a decimal value of "4"). The track 16 may likewise be provided with portions 30 and 32 which are twice as long as the portions 26 and 28. Because of this, the track 16 provides an indication of a binary value of fourth least digital significance (corresponding to a decimal value of "8").

Elements or sensors 34, 36, 38, and 40 are respectively associated with the tracks 10, 12, 14, and 16 to determine the characteristics of the portions adjacent to each of the associated tracks. For example, in the embodiment in FIG. 1 nonconductive portions are adjacent the sensors 34, 36, and 38 so that these sensors produce binary indications of zero. However, a conductive portion is adjacent to the track 16 so that the sensor 40 produces a binary indication of "1." Since the tracks 10, 12, 14, and 16 respectively have binary significances of "1," "2," "4," and "8," the indication provided by the sensors 34, 36, 38, and 40 would represent an analog value of "8."

As will be seen, the conductive and nonconductive portions in each track are aligned with the conductive and nonconductive portions in the other tracks in the prior art embodiment shown in FIG. 1. This means that all of the tracks will be simultaneously sensing changes from conductive portions to nonconductive portions as the digital value changes from an analog value such as "7" to an analog value such as "8." This is undesirable since all of the sensors tend to become unsettled at the same time. Furthermore, if the sensors are not precisely aligned, false indications of values may be provided at times on an instantaneous basis by different sensors as the analog value changes from "7" to "8" or from other numbers such as from "3" to "4."

Figure 2:
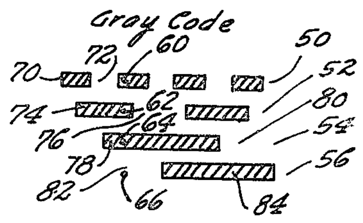
FIG. 2 PRIOR ART
FIG. 2 is a schematic diagram known in the prior art and operative in the Gray code to provide a conversion between analog and digital values of a single variable.

To overcome the disadvantages described in the previous paragraph, an encoder similar to that illustrated in FIG. 2 has been provided in the prior art. The encoder provides a plurality of tracks and first and second portions such as conductive and nonconductive portions in each track in a manner similar to that illustrated in FIG. 1 and discussed above. However, the first and second portions in each track are staggered relative to the first and second portions in the other tracks and are disposed in a particular arrangement such that at each instant a maximum of only one sensor experiences a change between first (or conductive) and second (or nonconductive) portions with progressive movements of the tracks toward the right or toward the left in FIG. 2. The encoder shown in FIG. 2 operates on the "Gray code."

The encoder shown in FIG. 2 includes a plurality of tracks 50, 52, 54, and 56 respectively corresponding to the tracks 10, 12, 14, and 16 in FIG. 1 and further includes a plurality of sensors 60, 62, 64, and 66 respectively corresponding to the sensors 34, 36, 38, and 40. The track 50 has first portions 70 and second portions 72 respectively corresponding to the first portions 18 and the second portions 20 in FIG. 1; the track 52 has first portions 74 and second portions 76 respectively corresponding to the first portions 22 and the second portions 24 in FIG. 1; the track 54 has a first portion 78 and second portion 80 respectively corresponding to the first portions 26 and the second portions 28 in FIG. 1; and the track 56 has a first portion 82 and a second portion 84 respectively corresponding to the first portion 30 and the second portion 32 in FIG. 2.

As will be seen, the first portion 78 in the track 54 symmetrically overlaps the first portion 84 in the track 56 in FIG. 2 such that one half of the portion 78 is to the left of the left edge of the portion 84 and the other half of the portion 78 is to the right of the left edge of the portion 84. Similarly, the portions 74 in the track 52 symmetrically overlap the portion 78 in the track 54, and the portions 70 in the track 70 symmetrically overlap the portions 74. In this way, only one track can change between a conductive and non-conductive relationship with respect to its associated sensor at any one time as the tracks are moved synchronously to the right and to the left in FIG. 1. This prevents false indications from being provided at times by the sensors 60, 62, 64, and 66 such as is provided in the embodiment shown in FIG. 1.

The operation of the converter shown in FIG. 2 may be seen from the specific example described below. The track 56 represents the polarity of the function of the two non-related variables. When the sensor 66 is contiguous to the conductive portion 84, it provides an indication of a positive polarity. The sensor 66 provides an indication of a negative polarity when it is contiguous to the portion 82. In the example illustrated in FIG. 2, the sensor 66 is contiguous to the portion 82 so that an indication of a negative polarity is provided.

In the embodiment illustrated in FIG. 1 the sensors 64, 62, and 60 in the tracks 54, 52 and 50 respectively provide binary indications of "1." As will be seen, the tracks 54, 52 and 50 respectively have digital significances corresponding to decimal values of "4," "2," and "1." This means that the value indicated by the sensors 64, 62 and 60 is "4" + 2 + 1 = 7. The decimal value of "7" is negative because of the positioning of the sensor 66 in contiguous relationship to the nonconductive portion 82.

As will be seen from the previous discussion and from the prior art embodiments shown in FIGS. 1 and 2, these prior art embodiments provide a conversion between digital and analog values of only a single variable. The value of this single variable is represented by movements toward the right and toward the left in FIGS. 1 and 2 on a synchronous basis of the different tracks such as the tracks 10, 12, 14, and 16. Considerable efforts have been devoted during the past twenty years to refine and extend such converters such as shown in FIGS. 1 and 2 and the uses provided for such converters. However in spite of such intensive efforts, no one has previously provided an arrangement for converting a value of a functional relationship of two independent variables into an indication which represents a conversion between analog and digital values.

Figure 4:
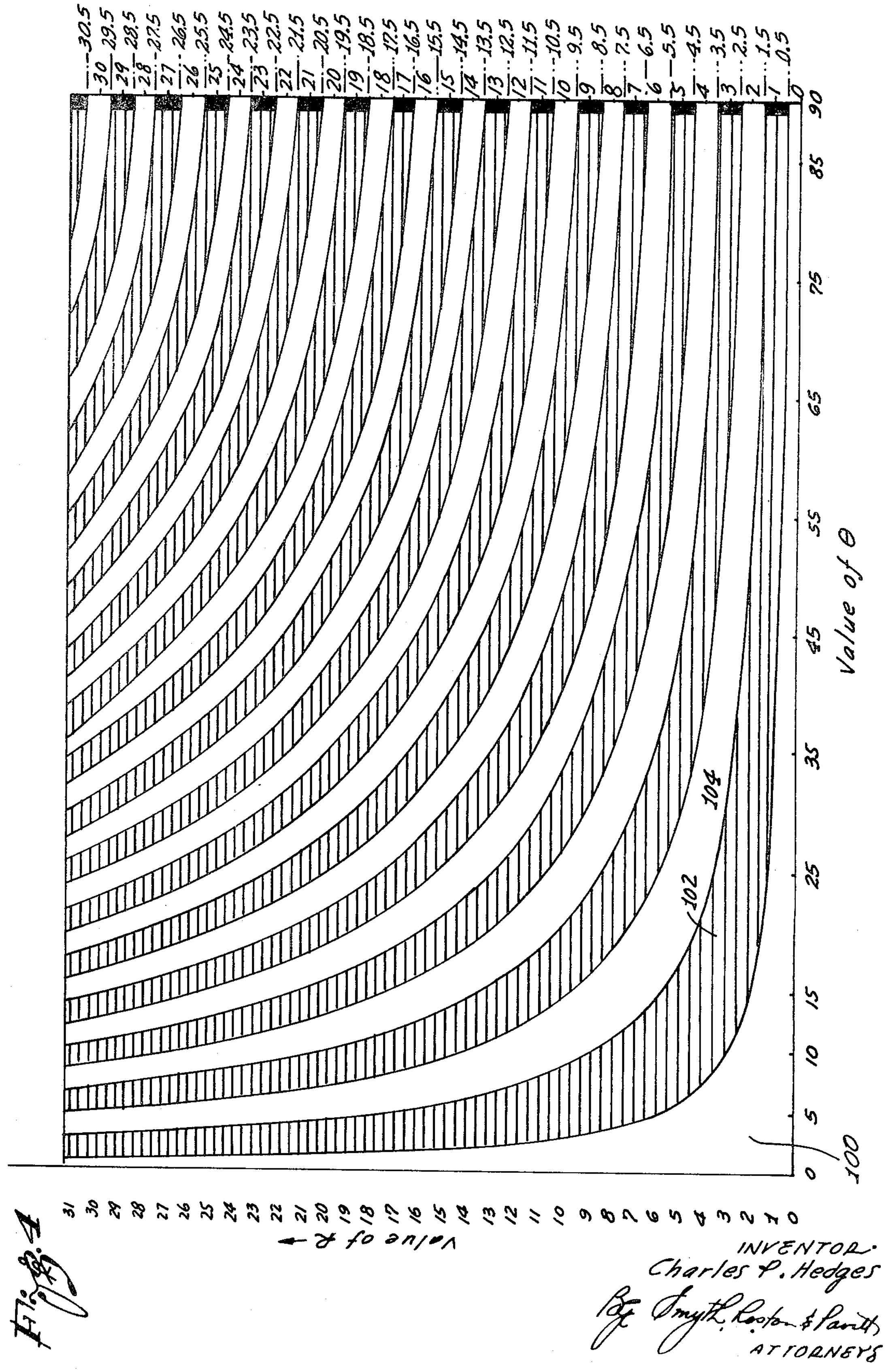
FIG. 4 is a plot along two coordinate axes of the value of the function of the two related variables for different values of each of the variables.

FIG. 4 provides an analytic representation as to the value of a function R sin $\theta$ for different values of R and $\theta$. As will be seen, the value of $\theta$ is indicated along the horizontal axis and the value of R is indicated along the vertical axis. Successive values are indicated by light and cross-hatched areas. For example, when the value of the function R sin $\theta$ lies between 0 and ½, this value is indicated by a clear portion 100 at the bottom left of the curve. The area immediately above and to the right of this first portion 100 is cross-hatched as at 102 to indicate that the value of the function R sin $\theta$ lies between "½" and "1-½." Similarly, when the value of R sin $\theta$ lies between "2" and "3", this is indicated by a clear portion 104 above and to the right of the cross-hatched portion 102. As will be seen, values between "0" and "31" for R sin $\theta$ are indicated in FIG. 4, corresponding to binary values of "0" and "$2^5$—1."

Each successive area in FIG. 4 is alternately cross-hatched and clear to indicate successive integers in the value of the function R sin $\theta$. In this way, odd values of R sin $\theta$ are indicated by cross-hatched areas and even values of R sin $\theta$ are indicated by clear areas. As will be appreciated, the different values of the R sin $\theta$ are determined on an analytic basis for the purposes of the plot in FIG. 4 by choosing different values for R and different values for $\theta$ and making arithmetic calculations to determine the resultant values of R sin $\theta$.

Figure 3:
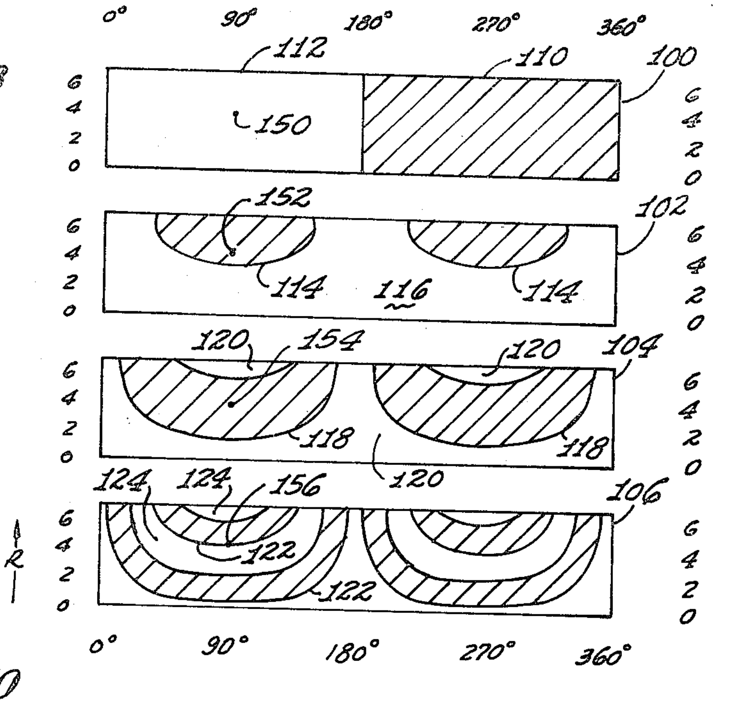
FIG. 3 is a schematic diagram illustrating one embodiment of an invention for providing a conversion between analog and digital values of a functional relationship of two variables such as R sin $\theta$.

FIG. 3 illustrates the configuration of first and second portions in different patterns 100, 102, 104, and 106 in one embodiment of the invention. The patterns 100, 102, 104, and 106 respectively correspond in FIG. 3 for movements along two coordinate axes to the tracks 50, 52, 54, and 56 for movements along a single coordinate axis. Each of the patterns 100, 102, 104, and 106 is movable in synchronism with the other patterns. The patterns may be moved synchronously along the horizontal axis corresponding to the direction of $\theta$ when the value of $\theta$ is changed. Similarly, the patterns 100, 102, 104, and 106 may be moved synchronously in the vertical direction corresponding to the value R when the value of R is changed. The patterns 100, 102, 104, and 106 are moved simultaneously along the horizontal and vertical axes when the values of R and $\theta$ are simultaneously changed.

In the embodiment shown in FIG. 3, the pattern 100 represents the polarity of the encoded indications; the pattern 102 represents the digit of greatest significance; the pattern 104 represents the digit of next greatest significance and the pattern 106 represents the digit of third digital significance of the four patterns shown in FIG. 4. As will be appreciated from the subsequent discussion and from the illustrations in FIGS. 5 to 9, inclusive, additional patterns may be provided to provide indications of digits of successively decreasing digital significance.

Each of the patterns 100, 102, 104, and 106 has first portions which may be conductive, magnetic or optical and second portions which may be nonconductive, nonmagnetic or non-optical. For example, the pattern 100 has a portion 110 which is conductive, magnetic or optical and a portion 112 which is nonconductive, nonmagnetic or non-optical. Similarly, the pattern 102 has first portions 114 which are preferably conductive and a second portion 116 which is nonconductive when the portions 114 are conductive. In like manner, the pattern 104 has first portion 118 and second portion 120. The pattern 106 also has first portions 122 and second portions 124.

The first and second portions in the different patterns 100, 102, 104, and 106 are chosen so that the patterns operate on a Gray code in the two directions $\theta$ and R corresponding to the operation of the tracks on the Gray code in the single direction in FIG. 2. In this way, only one of the patterns experiences a change between the first and second portions in the pattern at each instant relative to the associated sensor as the patterns are moved in any manner along the horizontal axis, along the vertical axis or along a combination of the two axes. This minimizes the possibilities of false indications being provided at various times since only one sensor can be operated at any one time to change from a binary indication of one digit to the next larger or smaller digit. The pattern 100 in FIG. 3 indicates the sign of the quantity represented by the encoder or converter shown in FIG. 3. In the positioning of the patterns relative to the associated sensors, the sensor 150 is disposed in contiguous relationship to the non-conductive portion 112. This can be used to mean that the quantity indicated in FIG. 3 is negative.

The pattern 102 provides an indication of the binary digit of highest digital significance. As illustrated in FIG. 3, the sensor 152 is contiguous to the portion 114 so that a binary value of "1" is indicated in the digit of greatest significance. Since only three patterns are provided in FIG. 3 to represent binary digits other than the sign digit, the sensor 152 on pattern 102 indicates a decimal value of +"7."

The sensor 154 associated with the pattern 104 is contiguous to one of the portions 118. This means that a binary value of "1" is indicated by the sensor 154. This binary value is subtracted in the Gray code from the binary value of "1" represented by the indication from the sensor 152. Since the pattern 104 has a significance of a decimal value of ±3, this value of "3" is subtracted from the value of "7" to indicate a total value of "4."

In the example shown in FIG. 3, the sensor 156 associated with the pattern 106 provides a binary indication of "1." This binary indication of "1" has a decimal significance of "1" since it is associated with the track of least digital significance. This binary value of "1" is added to the value of "4" provided by the patterns 102 and 104 to produce a total value of "5" for the indications provided by the sensors 152, 154 and 156. The value of the result, 5 is negative in view of the representation by the sensor 150.

It will be appreciated that the converter constituting the invention can be provided with other codes than the Gray code. For example, the converter can be provided with a natural binary code such as shown in FIG. 1 but with the code expanded along two coördinate axes rather than the single axis shown in FIG. 1. The converter can also be provided with a number of additional codes without departing from the scope of the invention. Each of these codes would correspond to codes now in existence for movement of tracks along a single coordinate but would be expanded to provide movements of patterns along two coordinates and to provide an indication of the functional relationship between the two coordinates.

Figure 5:
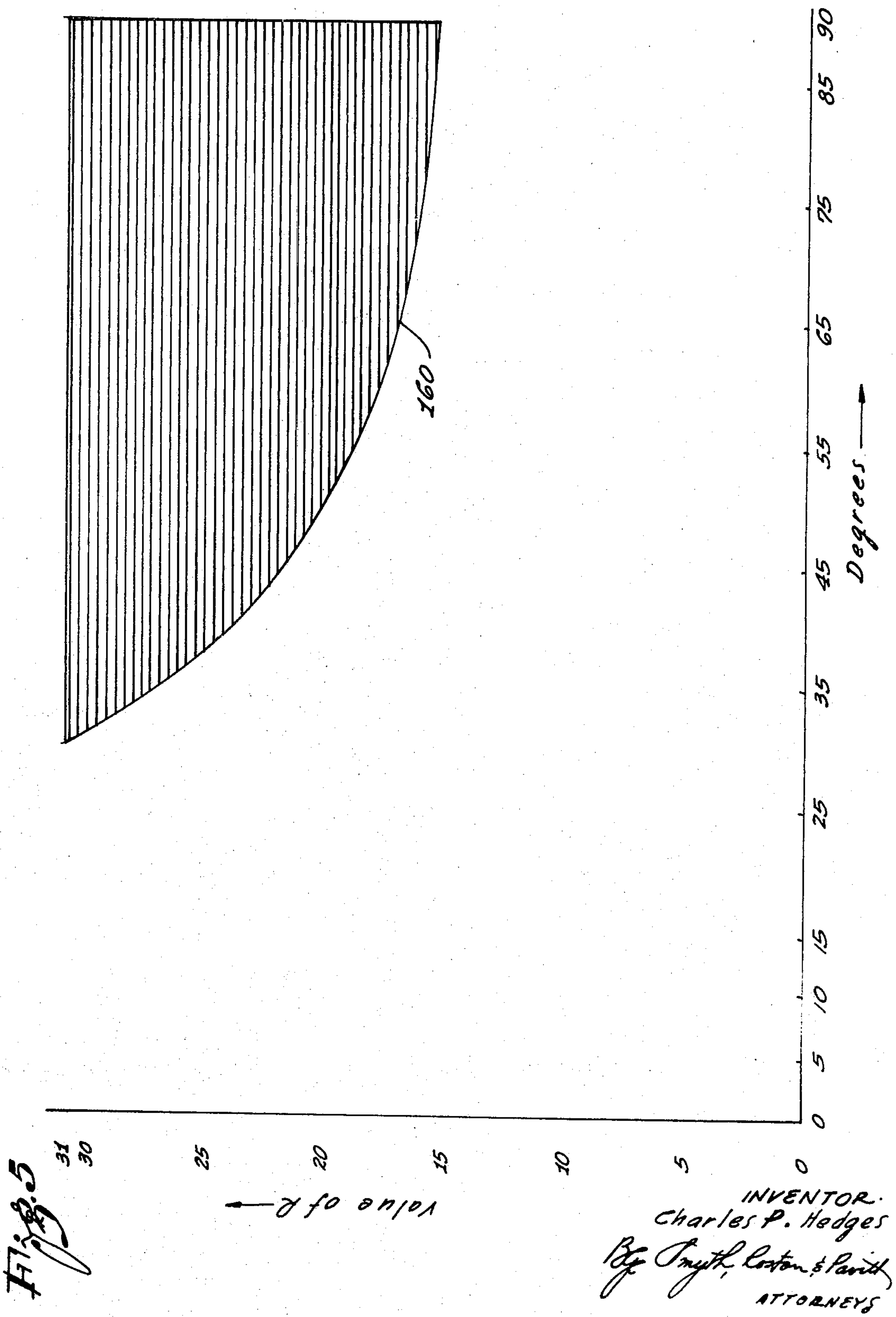
FIG. 5 is an indication as to the configuration of first and second portions in a track of greatest digital significance.

FIG. 5 illustrates how the digit of greatest digital significance such as the pattern 102 is obtained. As will be seen, FIG. 5 constitutes a quadrant of the pattern 102 in FIG. 3, with a portion 160 corresponding to one half of one of the conducting areas, 114, of pattern 102 in FIG. 3. Furthermore, the quadrant shown in FIG. 5 corresponds in configuration to the value of "31" in FIG. 4, this value having the highest digital significance in FIG. 4. As will be appreciated, a decimal value of "31" corresponds to a binary value of $2^5-1$.

FIG. 6 constitutes a quadrant of the pattern 104 in FIG. 3 with a portion 162 corresponding to one half of one of the conducting areas, 118, in pattern 104, in FIG. 3. When overlayed on the portion 160 in FIG. 5, the portion 162 in FIG. 6 symmetrically and only partially overlaps the portion 160 along the two coordinate axes in a manner similar to the overlapped relationship between the portions 78 and 84 along the single axis in FIG. 2.

Similarly, FIG. 7 constitutes a quadrant of the pattern 106 in FIG. 3 with portions 164 corresponding to one half of one pair of the conducting portions 122 in FIG. 3. When overlayed on the pattern shown in FIG. 6, the portions 164 have a symmetrical and only partially overlapped relationship to the portion 162 along the two coordinate axes corresponding to the overlapped relationship between the portions 74 and 78 along the single axis in FIG. 2.

FIG. 8 constitutes a quadrant of the pattern of fourth greatest digital significance. The conductive portions 166 in FIG. 8 symmetrically and only partially overlap the conductive portions 164 in the pattern shown in FIG. 7, when the pattern shown in FIG. 8 overlays the pattern shown in FIG. 7. Similarly, FIG. 9 illustrates a quadrant of a pattern of a fifth greatest significant digit. This pattern has conductive portions 168 which symmetrically and only partially overlap the conductive portions 166 in FIG. 8 when the pattern shown in FIG. 9 overlays the pattern shown in FIG. 8.

The apparatus described above has certain important advantages. It indicates as easily along two coordinate axes the functional relationship between two independent variables as the prior art indicates the value of a single variable along a single axis. Furthermore, the dimensions for providing the indication of the functional relationship between the two variables along the two coordinate axes is no greater along one axis. If the patterns are laid out on the same surface, the minimum area required will be N.X.Y. where N is the number of significant digits employed, X is the range along one axis, and Y the range along the second axis. However, the patterns and their respective sensors can be stacked in the third coordinate axis so that the instrument can be almost as small as 2X·2Y·NZ where Z is the total thickness of the pattern and its associated sensing means. The cost of indicating the functional relationship of the two variables along the two coordinate axes is also no greater than the cost of indicating the functional relationship of the single variable along the single axis. This may be seen partly from the fact that the number of patterns and sensors for the two interrelated variables in the two coordinate directions is essentially no greater than the number of tracks for the single variable in the single direction.

FIG. 10 illustrates an embodiment of the invention for converting a functional interrelationship between two variables in polar coordinates to a digital encoding of the two interrelated variables in Cartesian coordinates. For example, the two inputs may be "range" and "bearing." The value of range may be indicated along the axis of a cylinder 200 and the value of bearing may be indicated by the rotation of the cylinder 200 on its axis.

In the embodiment shown in FIG. 10, the cylinder 200 may have transparent and opaque portions of a pattern as its wall and selectively pass light from light sources 202 through lenses 204 for forming an image on the surface of the cylinder. Lenses 206 may be provided for collecting the light passing through the cylinder and redirecting the light to photosensors 208. Similarly, light sources 210 direct light through lenses 212 to the surface of the cylinder 200 to form an image on the surface. Lenses 214 receive the light passing through the surface of the cylinder 200 and direct the light to photosensors 216.

The light sources 202 and 210 and the lenses 204 and 212 are disposed on one arm 220 of a fork 218, this arm being disposed externally relative to the cylinder 200. Similarly, the lenses 206 and 214 and the photosensors 208 and 216 are disposed on a second arm 222 of the fork 218. The arm 222 is disposed internally of the cylinder 200, which is open at the left end to receive the arm.

The fork 218 is movable in the axial direction in accordance with the value of the range R to be indicated at each instant. The cylinder 200 is rotatable at each instant on its axis in accordance with the value of the bearing to be indicated at each instant. The resultant values of the functional relationship between range and bearing are indicated by the signals produced at the photosensors 208 and 216.

Although only a single set constituting the light sources 202, the lenses 204 and 206 and the photosensors 208 are illustrated, it will be appreciated that these elements are only schematic. Actually a number of sets of such elements are provided in a manner similar to that shown in FIG. 3 with each set providing an indication of a binary digit of individual digital significance. Similarly, the set constituting the light sources 210, the lenses 212 and 214 and the photosensors 216 are schematic since pluralities of sets will be provided in a manner similar to that shown in FIG. 3 with each set indicating the value of a binary digit of individual digital significance.

Two sets of light sources, lenses and photocells are shown schematically in FIG. 3 to provide indications of interrelated values. For example, the set constituting the light sources 202, the lenses 204 and 206 and the photosensors 208 illustrate in Cartesian coordinates the functional interrelationship of a value R sin $\theta$. Similarly, the light source 210, the lenses 212 and 214 and the photosensors 216 are illustrated schematically to provide an indication in Cartesian coordinates of the functional interrelationship represented by R cosin $\theta$.

As will be appreciated, other coordinate axes than linear coordinate axes and Cartesian coordinate axes may be provided. For example, the functional interrelationship of two variables may be indicated by movements of tracks on a synchronous basis along polar coordinates or spherical coordinates. It will also be appreciated that it may be possible to provide three dimensional interrelationships corresponding to the functional interrelationship between three variables in a manner similar to that provided above for the functional interrelationship between two variables.

Although the embodiments described herein are limited to the use of radix two codes, the invention is not so limited but may also be embodied by using patterns with more than two portions, and by using sensing and discriminating means capable of recognizing as many portions as there numbers in the radix. It is anticipated that radices of 8, 10, and 16 will be employed extensively.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for providing a conversion between analog and digital values of a function of two non-related variables, a plurality of patterns each extending along a pair of coordinates corresponding to the two non-related variables, each of the patterns having first and second portions providing first responses for the first portions and second responses for the second portions at any position along the pair of coordinates, the first and second portions of each pattern having along the pair of coordinates an individual shape governed by the isopleths of the function of the two non-related variables, a plurality of responsive elements each associated with a different pattern to produce a first digital signal in response to the first portions of the pattern and to produce a second digital signal different from the first signal in response to the second portions of the pattern, and means for providing a synchronous movement of the patterns in the plurality to any position along the first co-ordinate in accordance with the value of a first one of the non-related variables and a synchronous movement of the patterns to any position along the second co-ordinate in accordance with the value of the second one of the non-related variables.

2. The combination set forth in claim 1 wherein the first and second portions of the pattern are in Gray code.

3. The combination set forth in claim 1 wherein the responsive elements respond to the first portions of their associated patterns to produce an electrical signal having first digital characteristics and are unresponsive to the second portions of their associated tracks to produce an electrical signal having second digital characteristics different from the first digital characteristics.

4. In combination for providing a conversion between analog and digital values of a function of two non-related variables, a plurality of patterns each having first and second portions disposed in a pair of coordinate directions in an individual shape corresponding for the value of the function to a digit of individual significance different from the digital significance of the first and second portions in the other patterns, a plurality of responsive elements each associated with a different one of the patterns to provide an output signal having first and second digital characteristics in accordance with the positioning of the first and second portions of the pattern relative to the associated responsive element, and means for producing a synchronous movement of the patterns in the plurality relative to the associated responsive elements in the two coordinate directions to any particular position in accordance with the respective values of the two non-related variables, the first portions of each pattern having characteristics to provide a different response to the associated responsive element in the plurality than the second portions of the pattern.

5. The combination set forth in claim 4 wherein the shapes of the first and second portions for the different patterns are in a Gray code.

6. The combination set forth in claim 5 wherein the first portions of each pattern are operative upon the associated responsive element to obtain the production of an electrical signal having first digital characteristics and the second portions of each pattern are operative upon the associated responsive element to obtain the production of an electrical signal having second digital characteristics different from the first digital characteristics.

7. In combination for providing a conversion between analog and digital values of a function of two non-related variables, a plurality of patterns having an individual shape to indicate a digit of individual significance for the value of the function and each having first and second portions disposed along a pair of coordinate axes in a relationship to provide at any individual position on the pattern an indication of the digital significance of the function of the two non-related variables for the digit of individual significance, a plurality of elements each associated with a different pattern, the first portions of each pattern providing to the associated element in the plurality a first signal having first digital characteristics and the second portions of each pattern providing to the associated element in the plurality a second signal having second digital characteristics different from the first digital characteristics, and means for providing a synchronous movement of the patterns in the plurality to any position along a first one of the coordinate axes in accordance with the value of the first one of the two non-related values and for providing a synchronous movement of the patterns in the plurality to any position along the other one of the coordinate axes in accordance with the value of the second one of the two non-related values.

8. The combination set forth in claim 7 wherein the patterns in the plurality have rectangular coordinate axes.

9. The combination set forth in claim 7 where the shape of the patterns along the first and second coordinate axes are non-linear.

10. The combination set forth in claim 9 wherein the first and second portions of each pattern are arranged relative to the first and second portions of the other patterns in the plurality to provide a change from the first portion to the second portion of only one of the patterns in the plurality relative to the associated elements in the plurality at each instant in accordance with progressive movements of the patterns relative to the associated elements in any direction along the two co-ordinate axes.

11. In combination for producing a conversion between digital and analog values of a function of two non-related variables, a plurality of sensors each provided to sense information relating to a digit of individual digital significance, a plurality of patterns each associated with a different sensor in the plurality to provide information relating to a digit of individual digital significance, each of the patterns having portions of first and second conductivity relative to the associated sensor, the first portions of each pattern having characteristics to obtain the production of a signal by the associated sensor in representation of a binary "1" and the second portions of each pattern having characteristics to obtain the production by the associated sensor in representation of a binary "0," each of the patterns in the plurality being movable along first and second coordinate axes in accordance with the respective values of the two non-related variables to be represented, the first portions of each pattern having a configuration to represent a binary "1" in an individual configuration at any position along the two coordinate axes corresponding to the values of the two non-related variables for the digit of individual significance represented by the pattern, and means for providing a movement of the patterns in synchronism along each of the two coordinate axes relative to the sensors to any position along the two coordinate axes in representation at each instant of the respective values of the two non-related variables.

12. In the combination set forth in claim 11, the first portions of each track being conductive relative to the associated sensors and the second portions being non-conductive relative to the associated sensors and the sensors being disposed in contiguous relationship to the patterns to produce signals having a first digital significance when sensing the first portions of the associated patterns and to produce signals having a second digital significance when sensing the second portions of the associated patterns.

13. In the combination set forth in claim 12, the first and second portions in the different patterns being arranged in the Gray code.

14. The combination set forth in claim 11 wherein the first and second portions of the patterns have rectangular coordinate axes.

15. The combination set forth in claim 11 wherein the first and second portions of the patterns have Cartesian coordinates.

16. The combination set forth in claim 7 wherein the patterns in the plurality have Cartesian coordinate axes.

* * * * *